US009008506B2

United States Patent
Hsiao et al.

(10) Patent No.: US 9,008,506 B2
(45) Date of Patent: Apr. 14, 2015

(54) FIBER NETWORK EVENTS MEASUREMENT APPARATUS

(71) Applicant: Polarlink Technologies, Ltd., Kaohsiung (TW)

(72) Inventors: Ching-Wen Hsiao, Kaohsiung (TW); Hsuan-Hung Wu, Kaohsiung (TW); Shih-Tien Lin, Kaohsiung (TW); Fu-Chun Hung, Kaohsiung (TW); Yu-Shu Chen, Kaohsiung (TW); Ching-Lin Wu, Kaohsiung (TW); Chun-Hung Su, Kaohsiung (TW)

(73) Assignee: Polarlink Technologies, Ltd., Kaohsiung (TW)

( * ) Notice: Subject to any disclaimer, the term of this patent is extended or adjusted under 35 U.S.C. 154(b) by 162 days.

(21) Appl. No.: 13/760,867

(22) Filed: Feb. 6, 2013

(65) Prior Publication Data
US 2013/0322871 A1    Dec. 5, 2013

(30) Foreign Application Priority Data

May 29, 2012    (TW) .............................. 101210189 U (51) Int. Cl.
*H04B 10/08* (2006.01)
*H04B 10/07* (2013.01)
*H04B 10/071* (2013.01)

(52) U.S. Cl.
CPC .............. *H04B 10/07* (2013.01); *H04B 10/071* (2013.01)

(58) Field of Classification Search
CPC ... H04B 10/07; H04B 10/071; H04B 10/0731
USPC .................................... 398/13, 16, 17, 21, 25
See application file for complete search history.

(56) References Cited

U.S. PATENT DOCUMENTS

| | | | |
|---|---|---|---|
| 6,317,214 B1 * | 11/2001 | Beckett et al. ................. | 356/477 |
| 2005/0088166 A1 * | 4/2005 | Shank et al. ..................... | 324/85 |
| 2007/0194796 A1 * | 8/2007 | Harrison et al. ............... | 324/534 |
| 2012/0276853 A1 * | 11/2012 | De Ruijter ................. | 455/67.11 |

* cited by examiner

*Primary Examiner* — Dzung Tran
(74) *Attorney, Agent, or Firm* — Rabin & Berdo, P.C.

(57) ABSTRACT

A fiber network events measurement apparatus has a laser module alternately generating a pulse signal detecting beam and an FMCW detecting beam. The beams are sent to the fiber network route through a directional coupler. A photo detector receives feedback energy of the beams transmitting in the fiber network route and converts the feedback energy into electronic signals. A mixer uses a frequency difference calculation to obtain a comparison result according to an original and a reflected FMCW signal. The electronic signal is converted into a digital signal by an A/D converter. A signal control unit then obtains a compound trace result including information of characteristic trace and event positions. The compound trace result shows a fiber characteristic trace and event position trace for measuring the fiber network routes.

10 Claims, 8 Drawing Sheets

FIBER NETWORK EVENTS MEASUREMENT APPARATUS

CROSS-REFERENCE TO RELATED APPLICATIONS

This application claims the benefit of Taiwan patent application No. 101210189, filed on May 29, 2012, the disclosure of which is incorporated herein in its entirety by reference.

BACKGROUND OF THE INVENTION

1. Field of the Invention

The present invention relates to a measurement apparatus, and more particularly to a fiber network events measurement apparatus.

2. Description of Related Art

Figure 6:
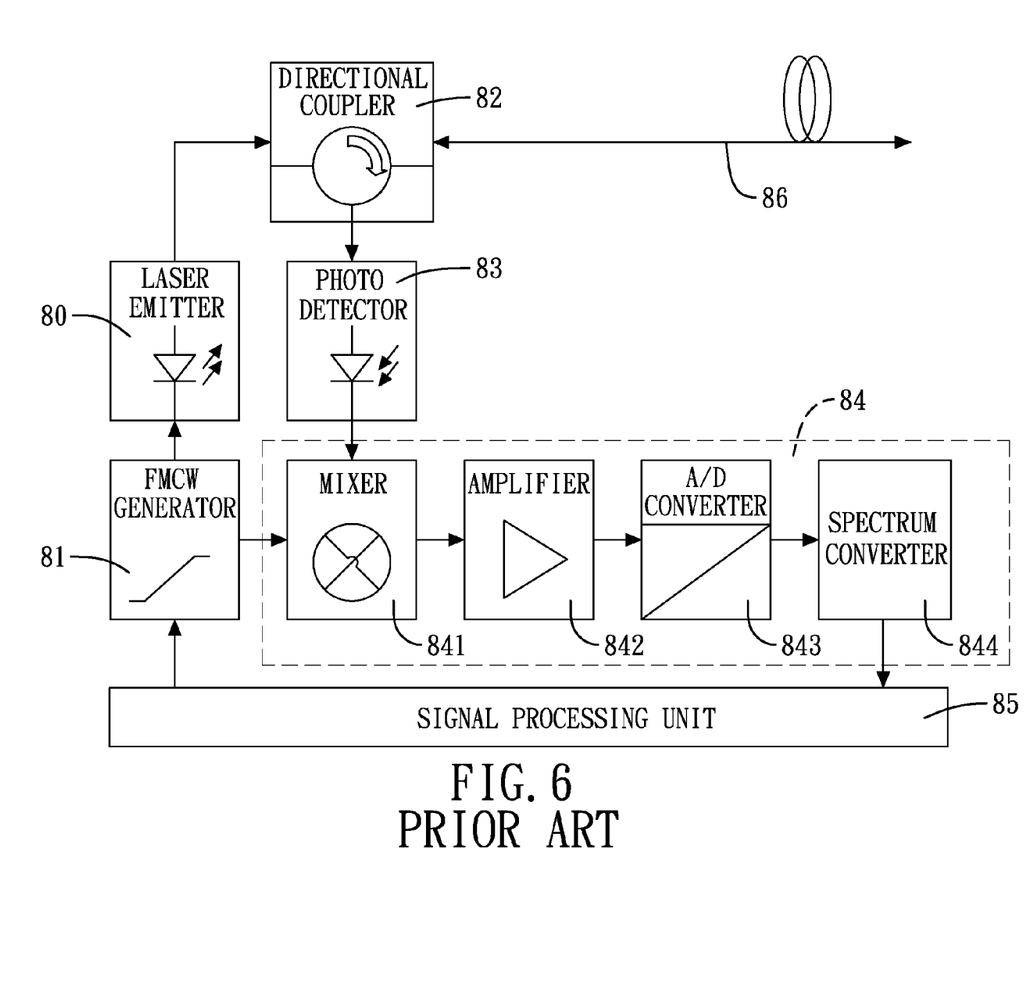
FIG. 6 is a circuit block diagram of a conventional FMCW device.

With reference to FIG. 6, a conventional fiber network testing device, i.e. an FMCW (Frequency-modulated continuous-wave) device comprises a laser emitter 80, an FMCW generator 81, a directional coupler 82, a photo detector 83, a signal converter 84 and a signal control unit 85.

The laser emitter 80 emits a testing beam. The FMCW generator 81 generates a periodic FMCW signal. The testing beam and the FMCW signal are combined and are outputted to a fiber network route 86 through the directional coupler 82. When the FMCW signal is transmitted in the fiber network route 86, the FMCW signal is reflected due to discontinuous planes of fiber cables.

The photo detector 83 receives the reflected energy of the FMCW signal and converts the reflected energy into an electronic signal.

Figure 7:
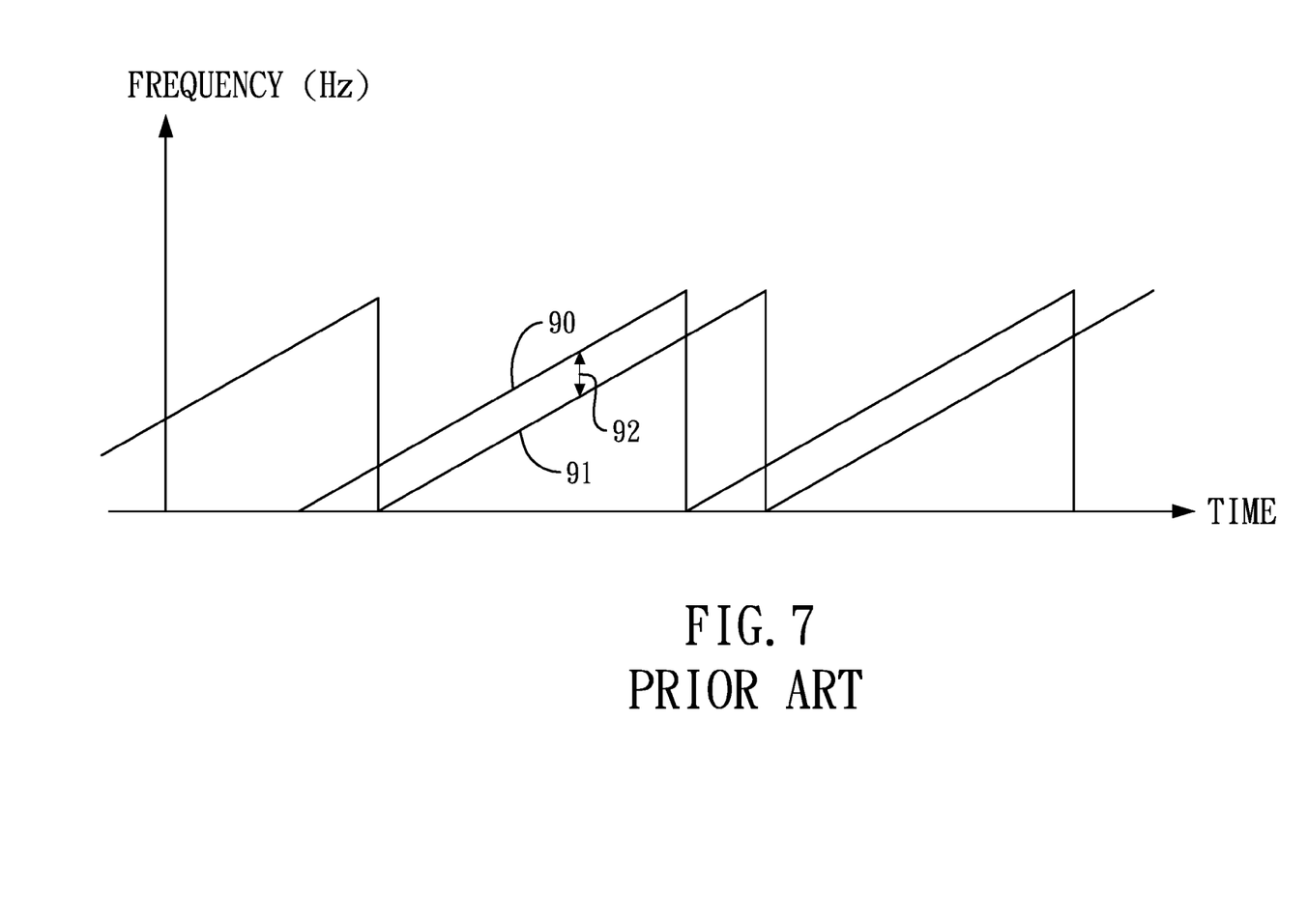
FIG. 7 is a waveform diagram of two FMCW signals.

The signal converter 84 is electrically connected to the FMCW generator 81 and the photo detector 83 and has a mixer 841, an amplifier 842, an A/D (analog to digital) converter 843 and a spectrum converter 844. The mixer 841 mixes an original and the reflected FMCW signal to obtain traces as illustrated in FIG. 7. The mixer 841 compares the traces of the two FMCW signals to obtain a comparison result through a frequency difference calculation. The amplifier 842 strengthens the amplitude of the comparison result. The A/D converter 843 converts the comparison result into a digital signal. The spectrum converter 844 acquires a reflection frequency by using fast Fourier transform (FFT) according to the digital signal. The signal control unit 85 then obtains the positions of reflected points A-D as illustrated in FIG. 8.

Figure 8:
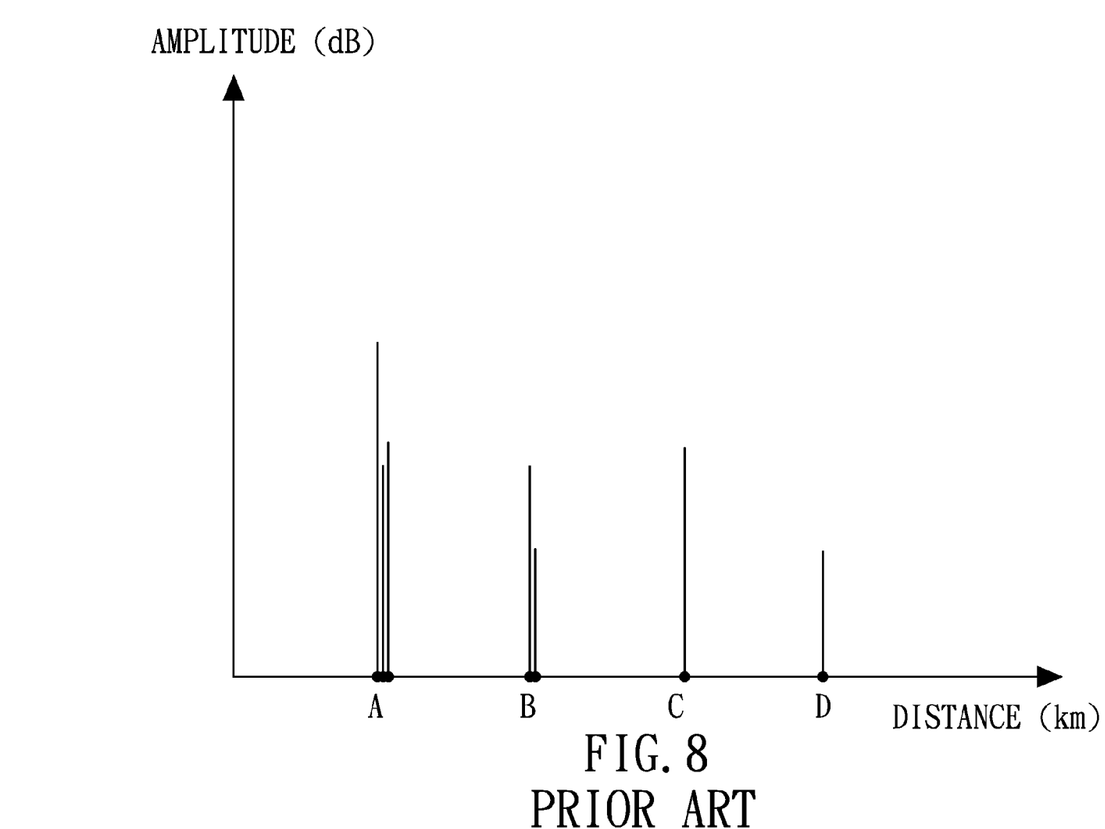
FIG. 8 is a trace including an original and a reflected FMCW signal.

The positions where the events occur can be effectively determined according to the trace of FIG. 8. However, the signals attenuate when they are transmitting in fiber cables. The attenuation condition of the signals is unobservable in the trace. The information disclosed in the trace is insufficient for determining the state of the fiber network routes.

SUMMARY OF THE INVENTION

An objective of the present invention is to provide a fiber network events measurement apparatus. The measurement apparatus not only provides the information of event positions, but also shows the signal attenuation condition for determining the state of the fiber network routes.

The measurement apparatus of the invention comprises:
a laser module respectively generating a pulse signal detecting beam and an FMCW detecting beam, wherein the pulse signal detecting beam includes a periodic pulse signal; and
the FMCW detecting beam includes a periodic FMCW signal;
a directional coupler having:
  a first port connected to the laser module to receive the pulse signal detecting beam and the FMCW detecting beam;
  a second port sending the pulse signal detecting beam and the FMCW detecting beam to a fiber network route and receiving feedback energy of the pulse signal and the FMCW signal from the fiber network route; and
  a third port;
a photo detector connected to the third port of the directional coupler to receive the feedback energy through the directional coupler and to respectively convert the feedback energy into an electronic signal;
a pulse signal converting module connected to the photo detector to strengthen the electronic signal of the pulse signal detecting beam and to convert the electronic signal into a digital signal;
an FMCW module connected to the photo detector and the laser module to mix an original FMCW signal and the feedback FMCW signal, to calculate a frequency difference according to the mixed FMCW signal and to convert the mixed FMCW signal into a digital signal; and
a signal control unit connected to the laser module, the photo detector, the pulse signal converting module and the FMCW module to alternately output the pulse detection beam and the FMCW detecting beam and to combine the digital signals from the pulse signal converting module and the FMCW module to obtain a compound trace result, wherein the compound trace result includes a characteristic trace and an event position trace.

With respect to the measurement apparatus of the invention, the compound trace result provides information including the signal attenuation and the event positions of the fiber network routes. The measurement apparatus also acquires related information of reflected events and avoids dead zone. Therefore, the technician can effectively observe the state of the fiber network routes when the technician reviews the compound trace result.

DETAILED DESCRIPTION OF THE PREFERRED EMBODIMENT

Figure 1:
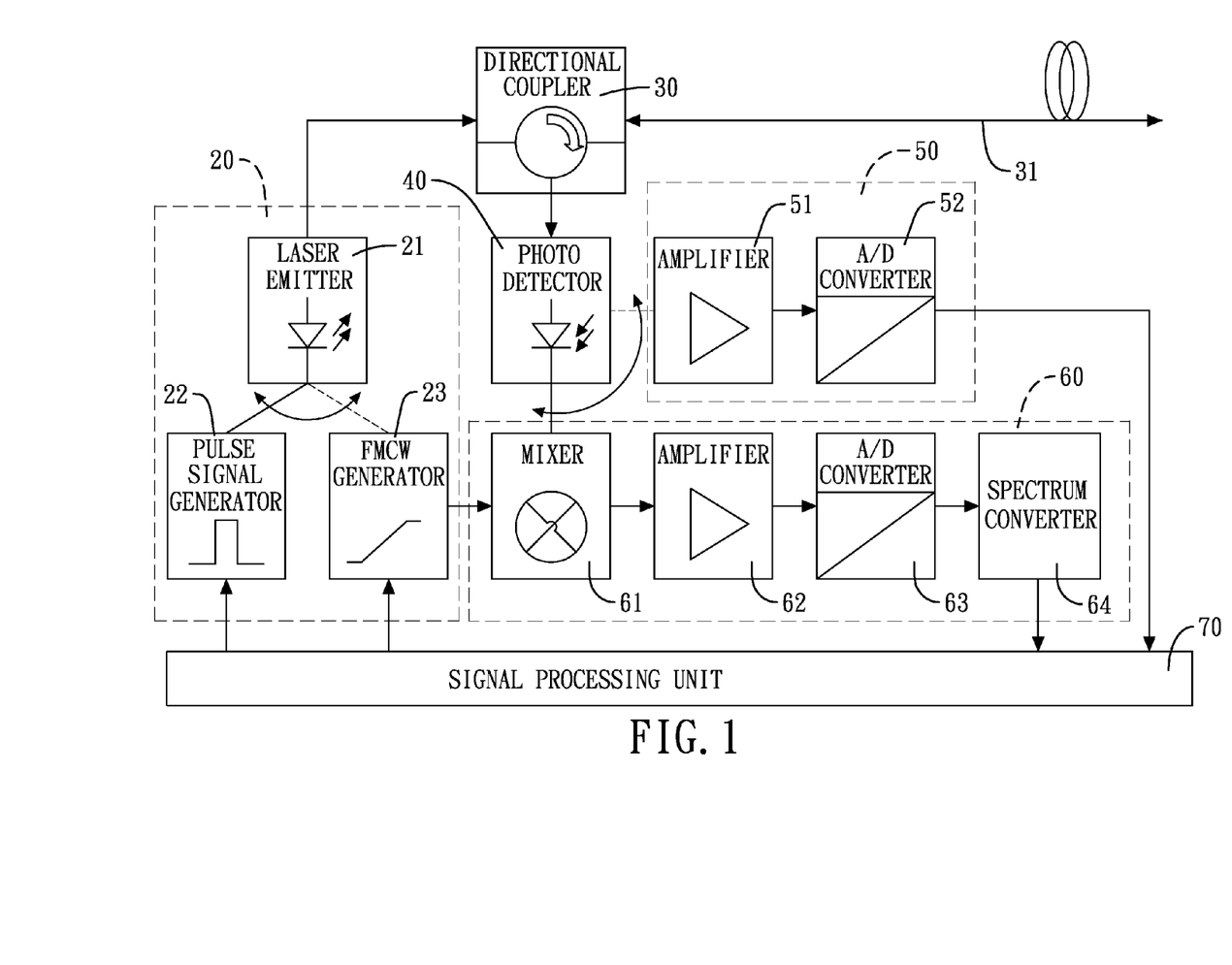
FIG. 1 is a circuit block diagram of the measurement apparatus of the invention.

With reference to FIG. 1, a first embodiment of the measurement apparatus of the invention is disclosed. The measurement apparatus comprises a laser module 20, a directional coupler 30, a photo detector 40, a pulse signal converting module 50, an FMCW module 60 and a signal control unit 70.

The laser module 20 comprises a laser emitter 21, a pulse signal generator 22 and an FMCW generator 23. The laser emitter 21 is adapted to emit a testing beam along a transmitting route. The pulse signal generator 22 is adapted to generate a periodic pulse signal. The pulse signal can be combined with the testing beam by a modulator to become a pulse signal detecting beam as a first measurement beam. The FMCW generator 23 is adapted to generate an FMCW signal, wherein the FMCW signal is periodic and linear. The FMCW signal can be combined with the testing beam by a modulator to become a FMCW detecting beam as a second measurement beam.

The directional coupler 30 is mounted in the transmitting route of the measurement beams and has a first port, a second port and a third port. The first port is connected to the laser module 20 to receive the pulse signal detecting beam and the FMCW detecting beam. The second port is used to send out the pulse signal detecting beam and the FMCW detecting beam to a fiber network route 31. When the pulse signal detecting beam is transmitted in the fiber network route 31, a majority of beam energy goes forward and a minority of beam energy (including the pulse signal) is reflected to the laser module 20. In addition, when the FMCW detecting beam is transmitted in the fiber network route 31, the FMCW detecting beam produces reflected feedback energy (including the FMCW signal) sent to the laser module 20 due to discontinuous planes. The second port then receives the feedback energy of the pulse signal detecting beam and the FMCW detecting beam.

The photo detector 40 is connected to the third port of the directional coupler 30. The photo detector 40 receives the feedback energy of the pulse signal detecting beam and the FMCW detecting beam through the directional coupler 30 and respectively converts the feedback energy into an electronic signal.

The pulse signal converting module 50 is connected to the photo detector 40 to amplify the electronic signal of the pulse signal detecting beam and convert the electronic signal into a digital signal. In this embodiment, the pulse signal converting module 50 has an amplifier 51 and an A/D (analog to digital) converter 52. The amplifier 51 is connected to the photo detector 40 to strengthen the amplitude of the electronic signal from the photo detector 40. The A/D converter 52 is connected to the amplifier 51 to convert the electronic signal into a digital signal and to send the digital signal to the signal control unit 70.

The FMCW module 60 is connected to the photo detector 40 and the FMCW generator 23 of the laser module 20. The FMCW module 60 is responsible for mixing an original FMCW signal with a feedback FMCW signal to calculate a frequency difference according to the mixed FMCW signal. The original FMCW signal stands for such signal that has not transmitted into the fiber network route yet. The FMCW module 60 also amplifies and converts the mixed FMCW signal into a digital signal.

In this embodiment, the FMCW module 60 comprises a mixer 61, an amplifier 62, an A/D converter 63 and a spectrum converter 64. The mixer 61 is connected to the FMCW generator 23 and the photo detector 40. The mixer 61 acquires signals of interest from the reflected FMCW signal through a bandpass filter and then mixes the signals with the original FMCW signal. After the mixer 61 mixes the signals, the mixer 61 calculates the frequency difference according to the mixed FMCW signal to acquire a comparison result. The amplifier 62 is connected to the mixer 61 to strengthen the amplitude of the comparison result. The A/D converter 63 is connected to the amplifier 62 to convert the comparison result into a digital signal. The spectrum converter 64 is connected to the A/D converter 63. The spectrum converter 64 uses a spectrum conversion to convert the digital signal of the comparison result for the signal control unit 70. In this embodiment, the spectrum conversion is fast Fourier transform (FFT) conversion.

The signal control unit 70 is connected to the laser module 20, the photo detector 40, the pulse signal converting module 50, and the FMCW module 60. The signal control unit 70 controls the laser module 20 to alternately output the pulse detection beam and the FMCW detecting beam. The signal control unit 70 also combines the feedback digital signals from the A/D converter 52 and spectrum converter 64 into a compound result.

Figure 2:
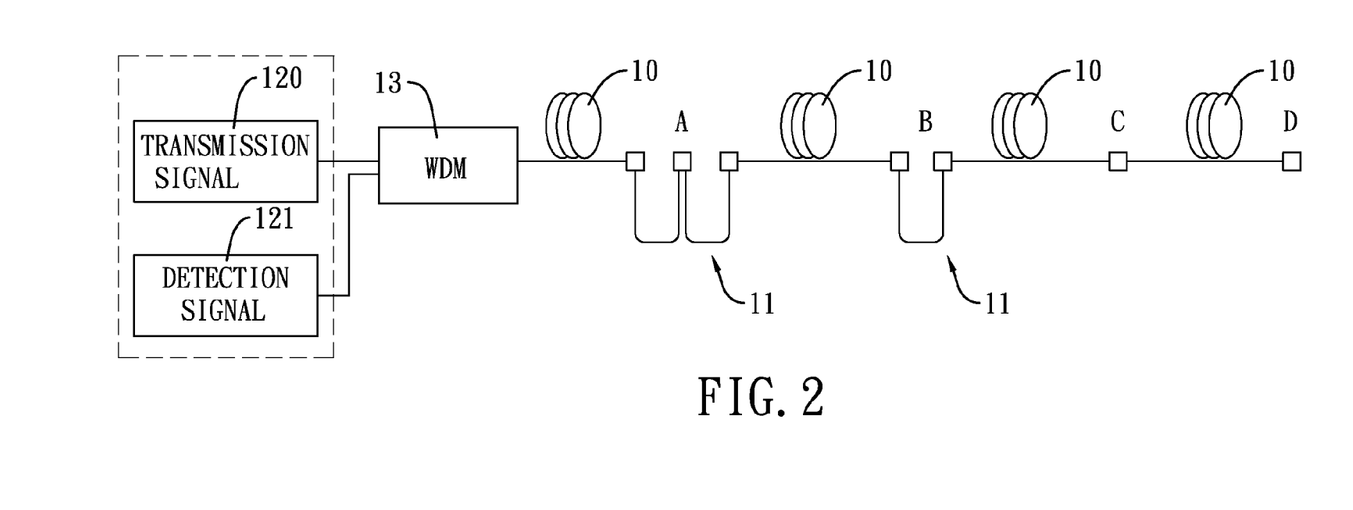
FIG. 2 is an operation diagram of the measurement apparatus applied to a fiber network system.

With reference to FIG. 2, an operation diagram of the measurement apparatus applied to a fiber network system is disclosed. WDM (wavelength division multiplexer) 13 receives a transmission signal 120 and a detection signal 121. The transmission signal 120 stands for the original optical signal in the fiber network system. The detection signal 121 stands for the pulse signal detecting beam or the FMCW detecting beam. The WDM 13 modulates the transmission signal 120 and the detection signal 121 and sends the modulated signal to the fiber network route. For example, there are multiple routes 10 between the locations A to D, wherein the routes 10 can be connected through wire jumpers 11.

Figure 3:
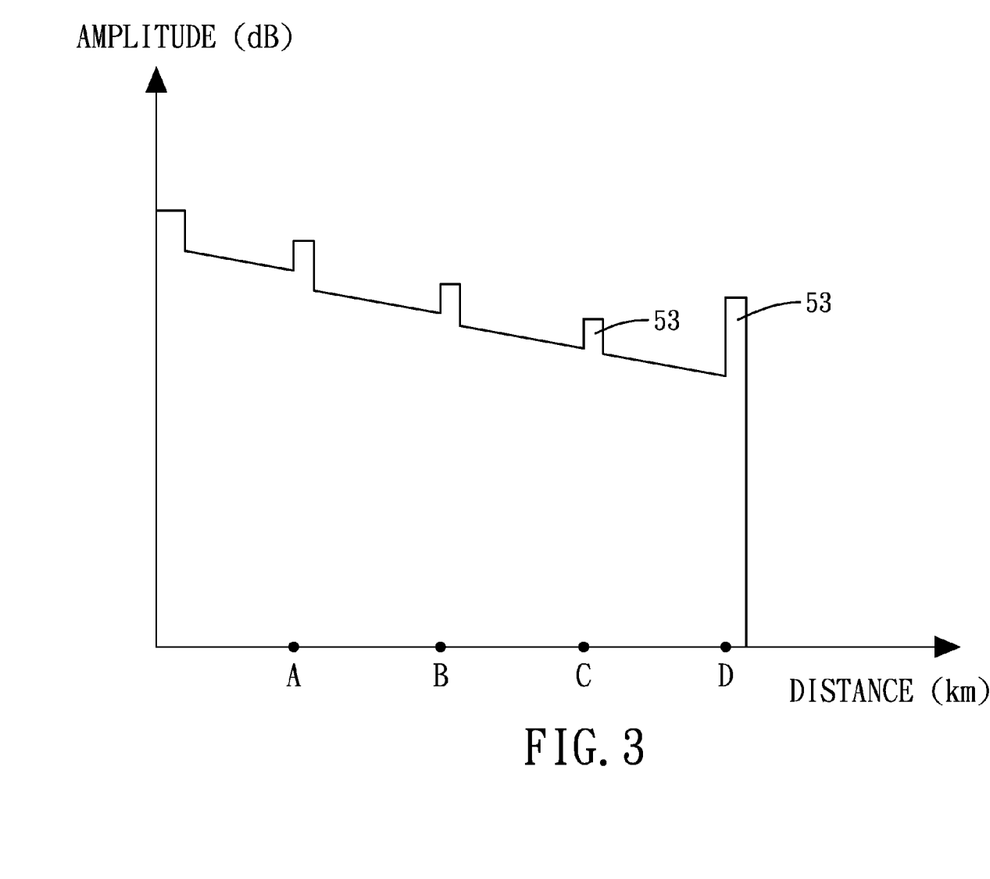
FIG. 3 is a characteristic trace waveform diagram.

When the signal control unit 70 controls the laser emitter 21 to connect to the pulse signal generator 22, the laser emitter 21 emits the pulse signal detecting beam. Meanwhile, the signal control unit 70 controls the photo detector 40 to connect to the pulse signal converting module 50. When the pulse signal detecting beam is transmitted in the fiber network route, the pulse signal detecting beam is backward scattered due to inhomogeneous density and material of fiber cables. The backward scattered energy is converted into a digital signal through the directional coupler 30, the photo detector 40 and the pulse signal converting module 50. The digital signal is then received by the signal control unit 70. The digital signal is obtained from the pulse signal detecting beam which has backward scattered, amplified and converted. The signal control unit 70 draws a characteristic trace as FIG. 3 according to the amplitude and the period of the backward scattered pulse signal detecting beam. The trace stands for the relationship between the amplitude and the distance of the pulse detection beam transmitting in the fiber network route. As a result, the characteristic trace shows energy loss of the pulse signal detecting beam.

When the signal control unit 70 controls the laser emitter 21 to connect to the FMCW generator 23, the laser emitter 21 emits the FMCW detecting beam. Meanwhile, the signal control unit 70 controls the photo detector 40 to connect to the FMCW module 60. When the FMCW detecting beam is transmitted in the fiber network route, the FMCW signal is backward scattered due to discontinuous planes of the fiber cables. The backward scattered energy of the FMCW signal is converted into a digital signal through the directional coupler 30, the photo detector 40 and the FMCW module 60. The digital signal is then received by the signal control unit 70.

Figure 4:
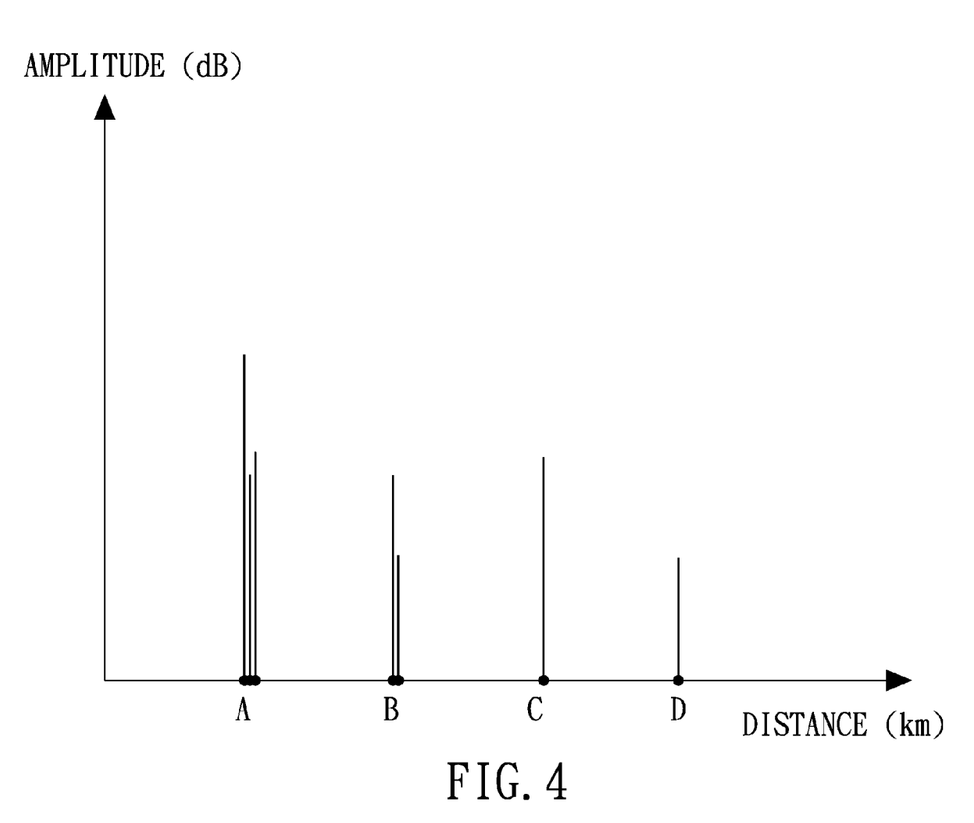
FIG. 4 is an event position trace waveform diagram.

The mixer 61 mixes the original FMCW signal and the reflected FMCW signal, and obtains a comparison result from the mixed FMCW signal by using a frequency difference calculation. The comparison result is sent to the signal control unit 70 after the comparison result is amplified and converted. The signal control unit 70 then derives a reflected frequency, determines a reflected position according to the reflected frequency and draws an event position trace as illustrated in FIG. 4. Referring to the event position trace, the positions where events occur can be accurately observed.

Figure 5:
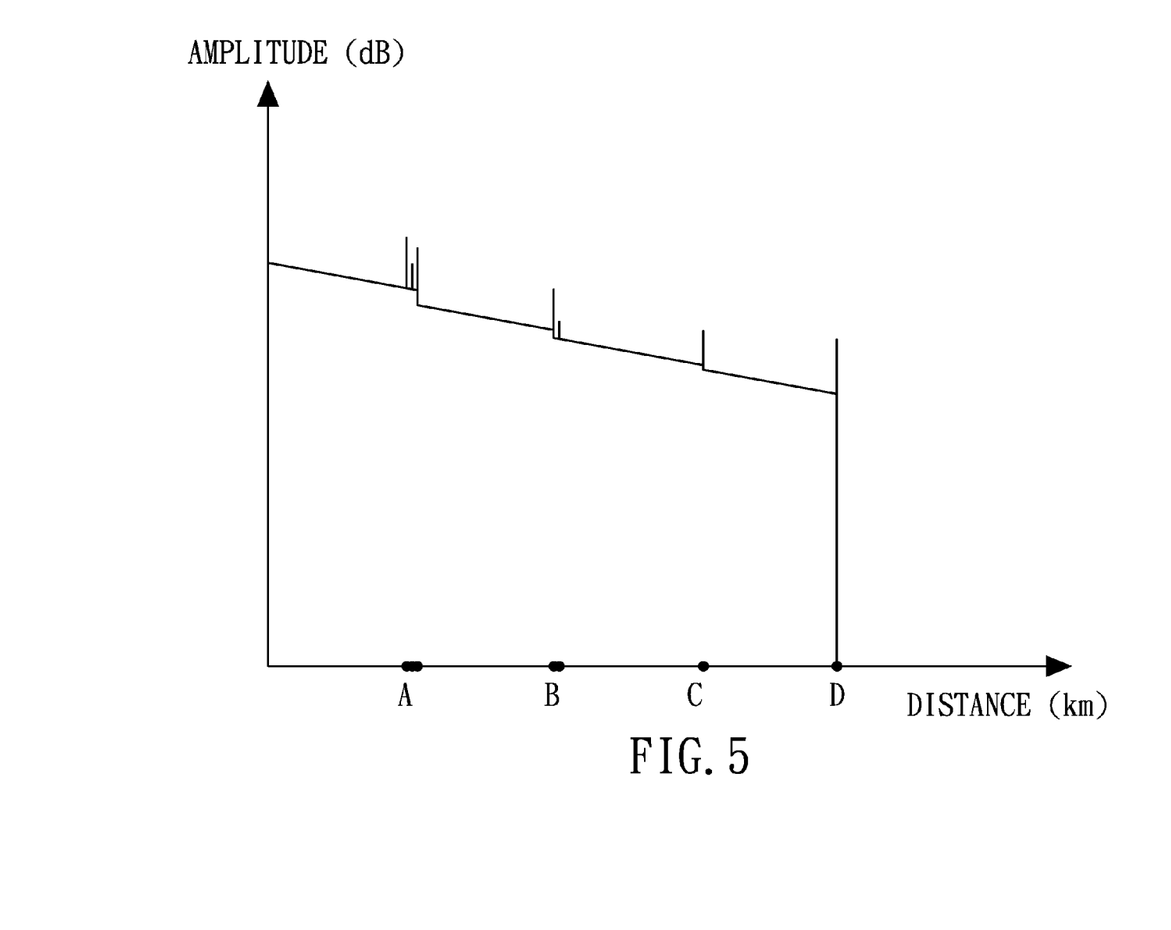
FIG. 5 is a compound trace result waveform diagram.

Finally, the signal control unit 70 combines the characteristic trace and the event position trace to obtain a compound trace result as illustrated in FIG. 5. The characteristic trace of FIG. 3 only shows the attenuation condition but the dead zones 53 occur at the event positions A-D. The events cannot be obviously determined in the characteristic trace of FIG. 3.

The compound trace result of FIG. 5 not only shows the attenuation condition, but also shows the event positions and avoids occurrence of dead zones 53, such that the events can be clearly observed. In addition, the compound trace result of FIG. 5 also shows whether the fiber network route is disrupted. In short, technicians can effectively determine the event positions and the signal attenuation condition according to the compound trace result of FIG. 5.

What is claimed is:

1. A fiber network events measurement apparatus comprising:
    a laser module respectively generating a pulse signal detecting beam and an FMCW detecting beam, wherein the pulse signal detecting beam includes a periodic pulse signal; and
    the FMCW detecting beam includes a periodic FMCW signal;
    a directional coupler having:
        a first port connected to the laser module to receive the pulse signal detecting beam and the FMCW detecting beam;
        a second port sending the pulse signal detecting beam and the FMCW detecting beam to a fiber network route and receiving feedback energy of the pulse signal and the FMCW signal from the fiber network route; and
        a third port;
    a photo detector connected to the third port of the directional coupler to receive the feedback energy through the directional coupler and to respectively convert the feedback energy into an electronic signal;
    a pulse signal converting module connected to the photo detector to strengthen the electronic signal of the pulse signal detecting beam and to convert the electronic signal into a digital signal;
    an FMCW module connected to the photo detector and the laser module to mix an original FMCW signal and the feedback FMCW signal, to calculate a frequency difference according to the mixed FMCW signal and to convert the mixed FMCW signal into a digital signal; and
    a signal control unit connected to the laser module, the photo detector, the pulse signal converting module and the FMCW module to alternately output the pulse detection beam and the FMCW detecting beam and to combine the digital signals from the pulse signal converting module and the FMCW module to obtain a compound trace result, wherein the compound trace result includes a characteristic trace and an event position trace, wherein
        when the pulse signal detecting beam is outputted, the signal control unit controls the photo detector to connect to the pulse signal converting module; and
        when the FMCW detecting beam is outputted, the signal control unit controls the photo detector to connect to the FMCW module.

2. The measurement apparatus as claimed in claim 1, wherein the pulse signal converting module comprises:
    an amplifier connected to the photo detector to strengthen the amplitude of the electronic signal of the photo detector; and
    an A/D converter connected to the amplifier to convert the electronic signal into a digital signal and sending the digital signal to the signal control unit.

3. The measurement apparatus as claimed in claim 2, wherein the laser module comprises:
    a laser emitter emitting a testing beam;
    a pulse signal generator generating a periodic pulse signal, wherein the periodic pulse signal is combined with the testing beam to become the pulse signal detecting beam; and
    an FMCW generator generating an FMCW signal, wherein the FMCW signal is combined with the testing beam to become the FMCW detecting beam.

4. The measurement apparatus as claimed in claim 2, wherein
    the FMCW module comprises:
        a mixer connected to the laser module and the photo detector to obtain a comparison result through a frequency difference calculation according to the mixed FMCW signal;
        an amplifier connected to the mixer to strengthen the amplitude of the comparison result;
        an A/D converter connected to the amplifier of the FMCW module to convert the comparison result into a digital signal; and
        a spectrum converter connected to the A/D converter of the FMCW module to use a spectrum conversion to convert the digital signal of the comparison result for the signal control unit; and
    the laser module comprises:
        a laser emitter emitting a testing beam;
        a pulse signal generator generating a periodic pulse signal, wherein the periodic pulse signal is combined with the testing beam to become the pulse signal detecting beam; and
        an FMCW generator generating an FMCW signal, wherein the FMCW signal is combined with the testing beam to become the FMCW detecting beam.

5. The measurement apparatus as claimed in claim 4, wherein the spectrum converter is a fast Fourier transform converter.

6. The measurement apparatus as claimed in claim 1, wherein the FMCW module comprises:
    a mixer connected to the laser module and the photo detector to obtain a comparison result through a frequency difference calculation according to the mixed FMCW signal;
    an amplifier connected to the mixer to strengthen the amplitude of the comparison result;
    an A/D converter connected to the amplifier of the FMCW module to convert the comparison result into a digital signal; and
    a spectrum converter connected to the A/D converter of the FMCW module to use a spectrum conversion to convert the digital signal of the comparison result for the signal control unit.

7. The measurement apparatus as claimed in claim 6, wherein the spectrum converter is a fast Fourier transform converter.

8. The measurement apparatus as claimed in claim 7, wherein the laser module comprises:
    a laser emitter emitting a testing beam;
    a pulse signal generator generating a periodic pulse signal, wherein the periodic pulse signal is combined with the testing beam to become the pulse signal detecting beam; and
    an FMCW generator generating an FMCW signal, wherein the FMCW signal is combined with the testing beam to become the FMCW detecting beam.

9. The measurement apparatus as claimed in claim 6, wherein the laser module comprises:
- a laser emitter emitting a testing beam;
- a pulse signal generator generating a periodic pulse signal, wherein the periodic pulse signal is combined with the testing beam to become the pulse signal detecting beam; and
- an FMCW generator generating an FMCW signal, wherein the FMCW signal is combined with the testing beam to become the FMCW detecting beam.

10. The measurement apparatus as claimed in claim 1, wherein the laser module comprises:
- a laser emitter emitting a testing beam;
- a pulse signal generator generating a periodic pulse signal, wherein the periodic pulse signal is combined with the testing beam to become the pulse signal detecting beam; and
- an FMCW generator generating an FMCW signal, wherein the FMCW signal is combined with the testing beam to become the FMCW detecting beam.

* * * * *